Oct. 6, 1970    J. PALFREYMAN ET AL    3,532,438
AEROFOIL-SHAPED BLADES, AND BLADE ASSEMBLIES, FOR
USE IN A FLUID FLOW MACHINE
Filed Nov. 20, 1967    17 Sheets-Sheet 1
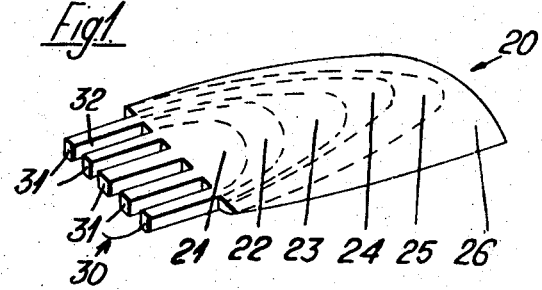
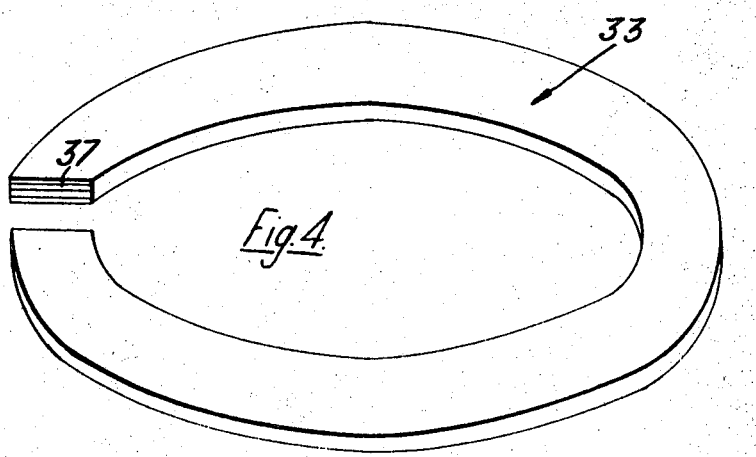
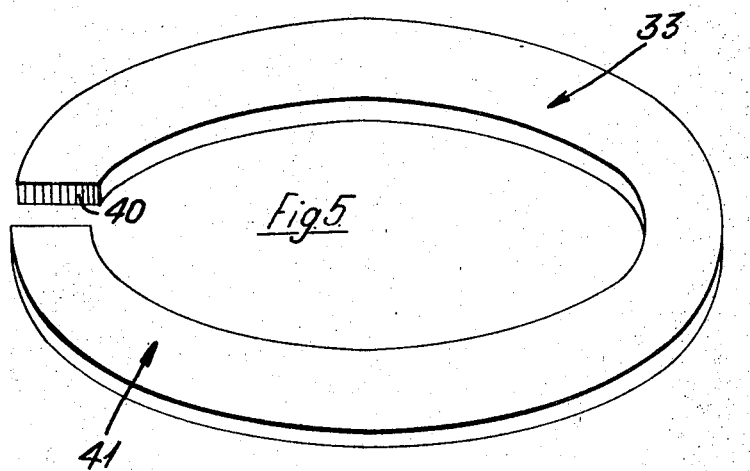
Inventors
Jack Palfreyman
Henry Edward Middleton
By
Cushman, Darby & Cushman
Attorneys

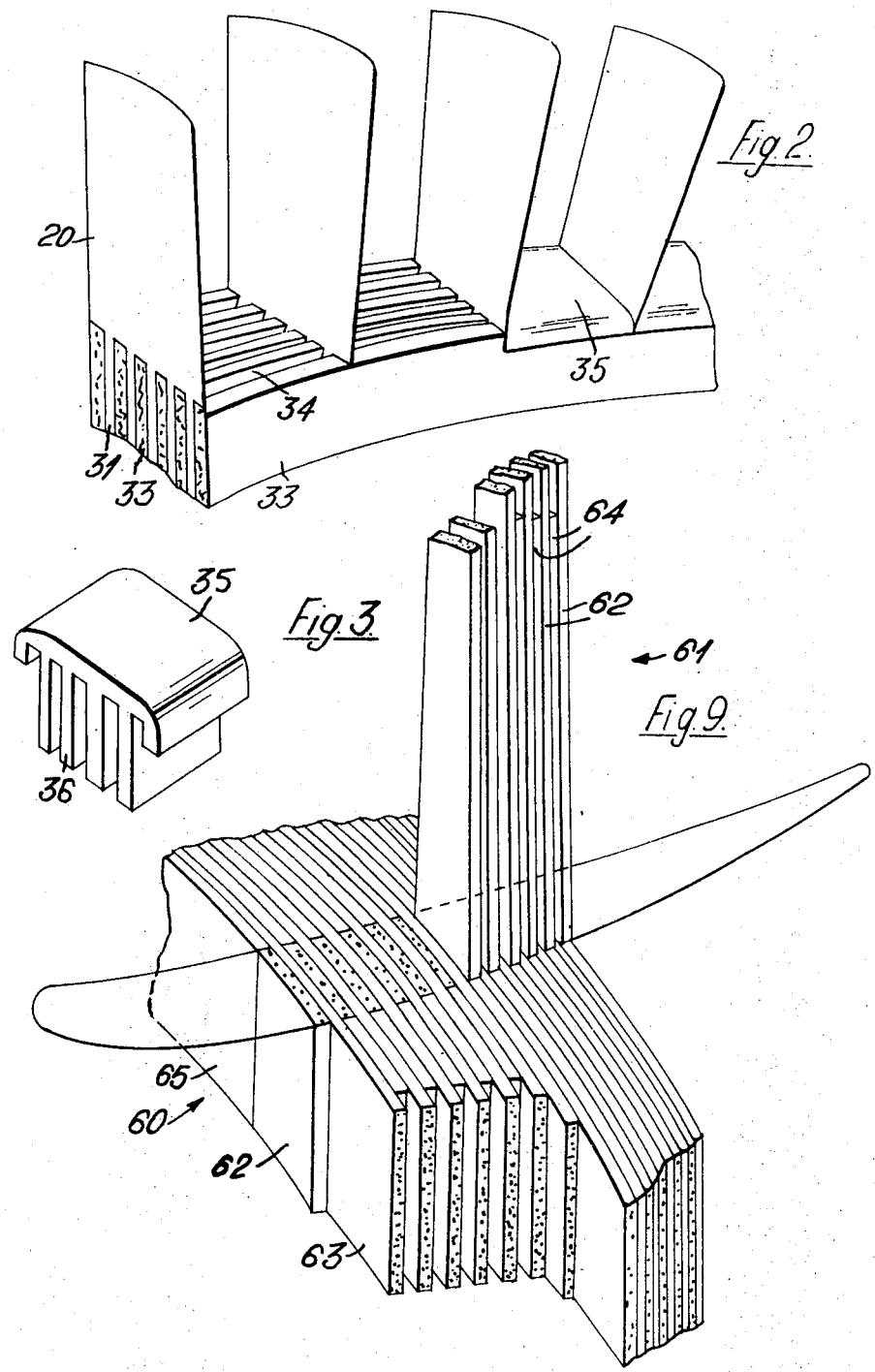

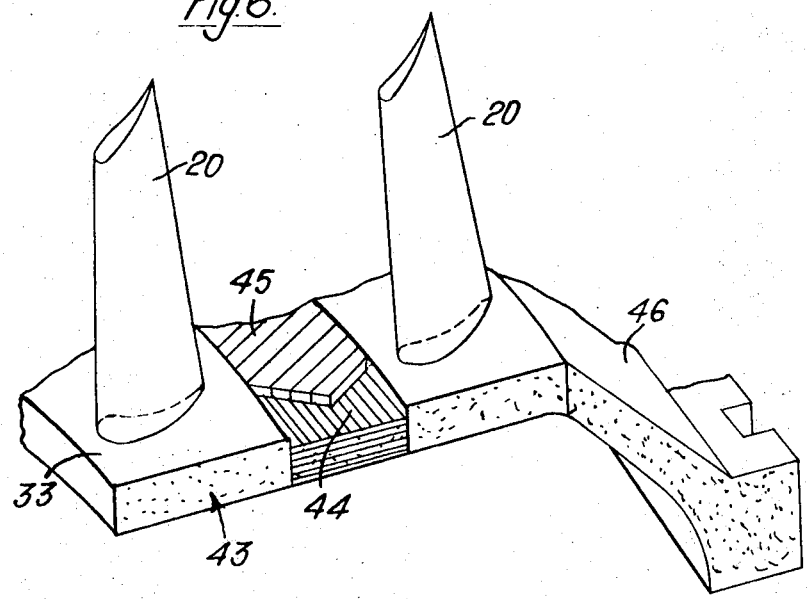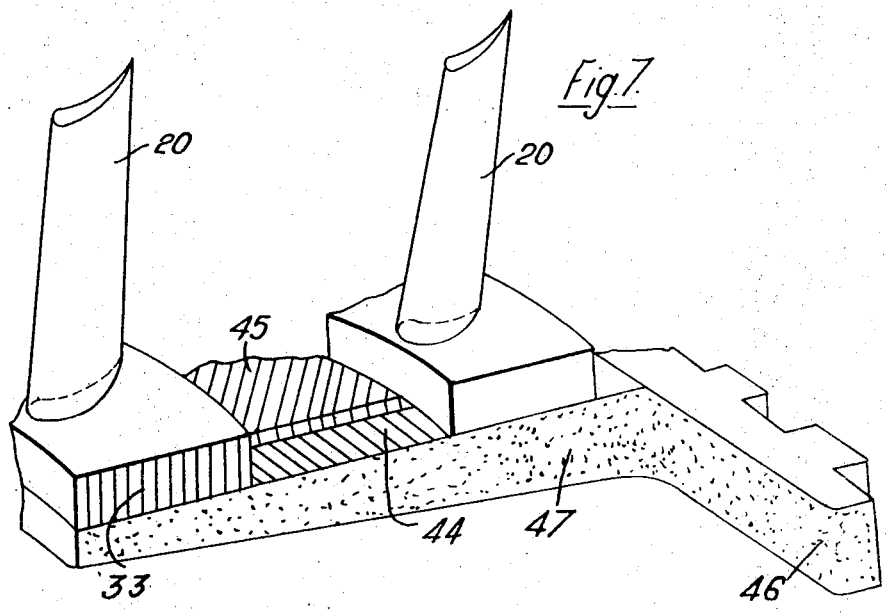

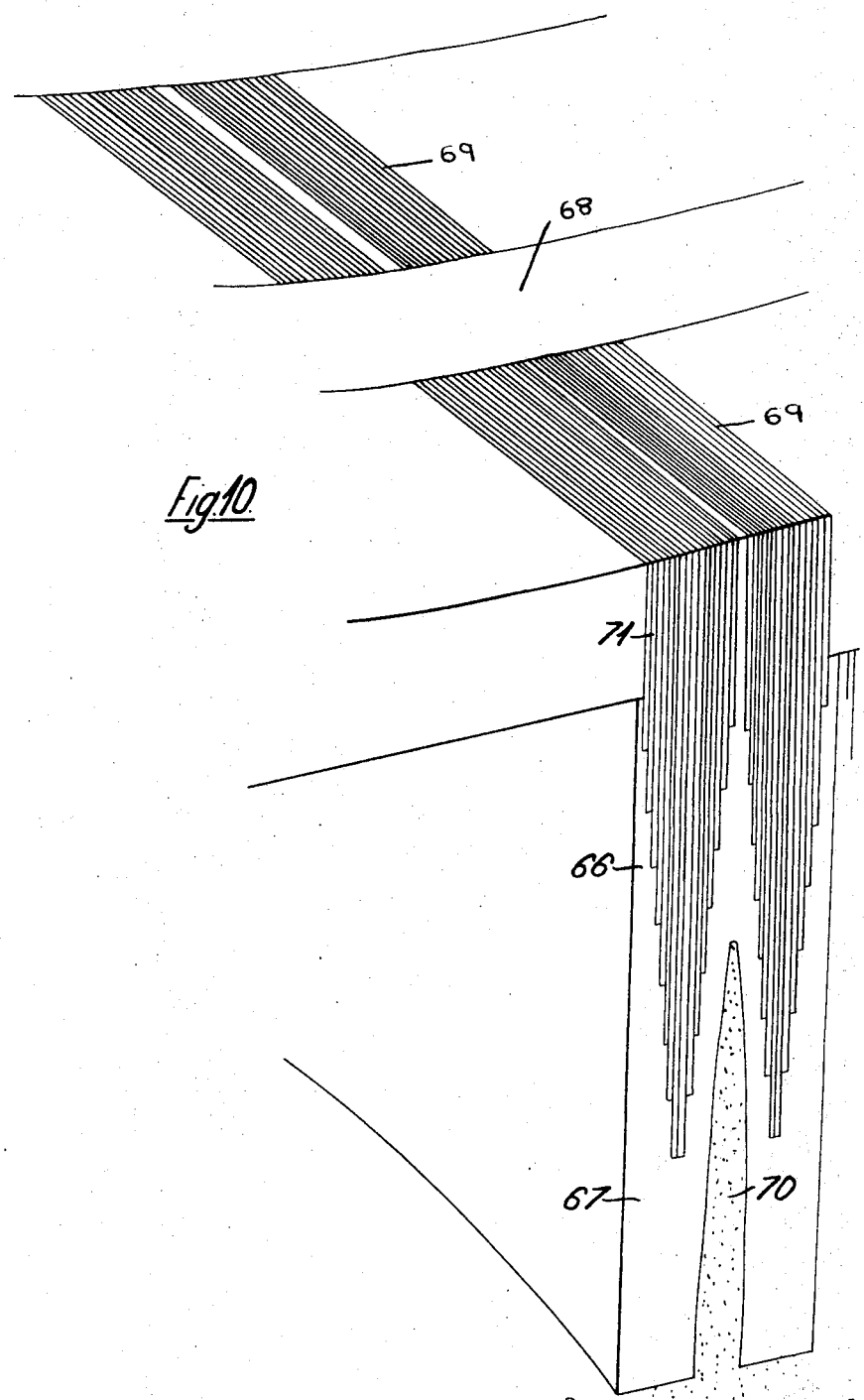

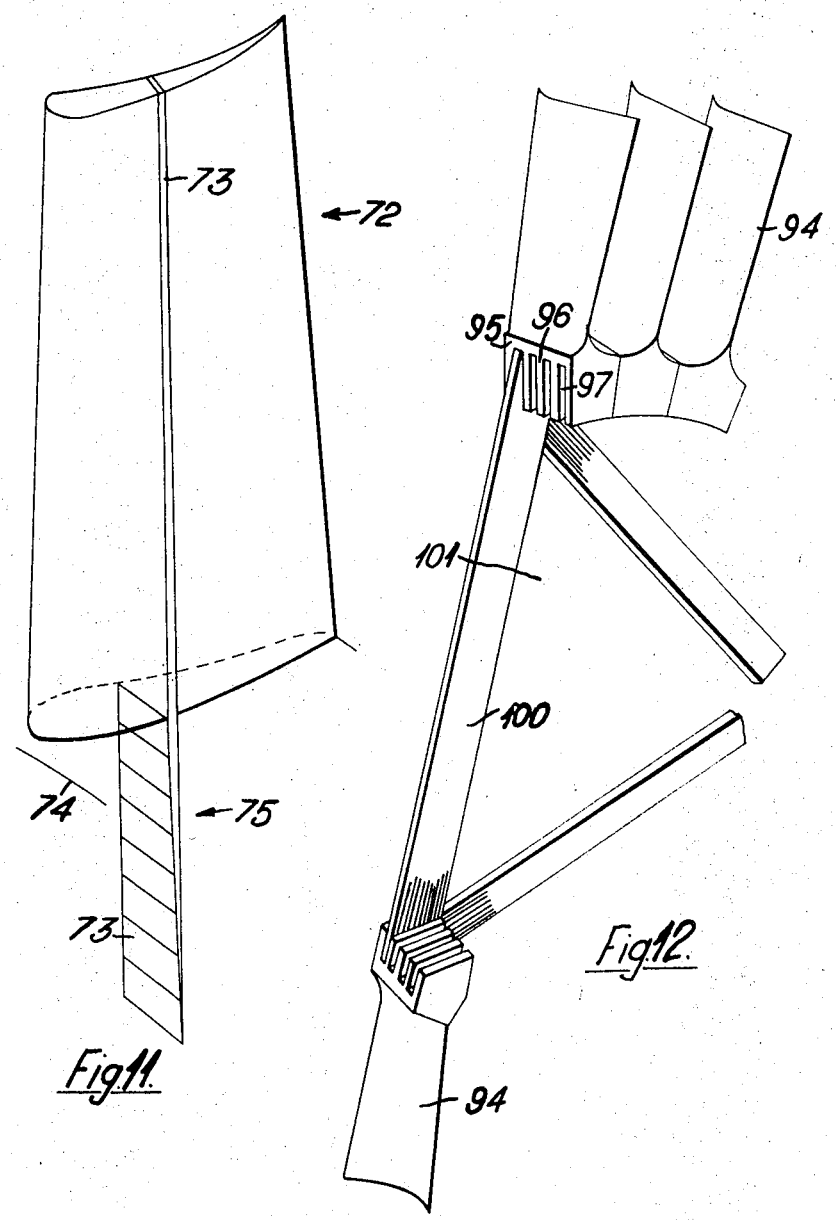

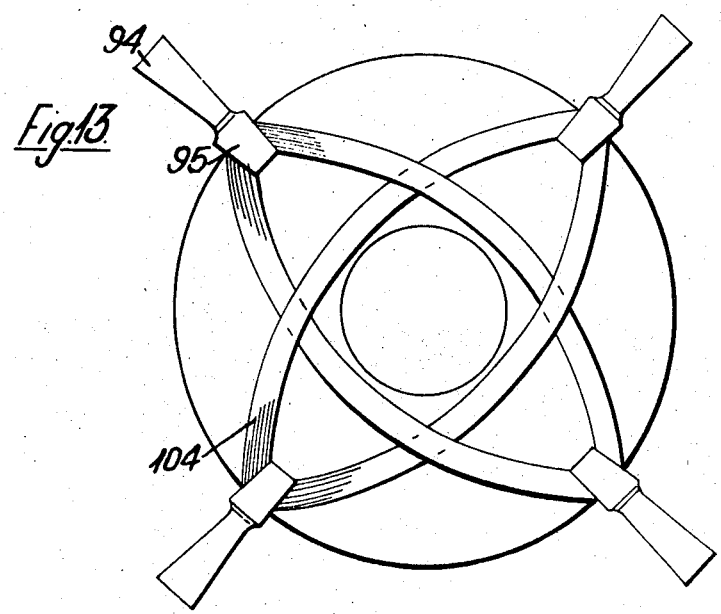
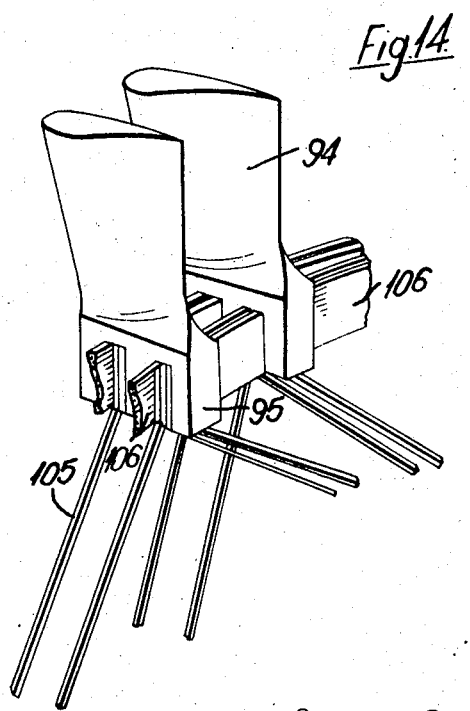

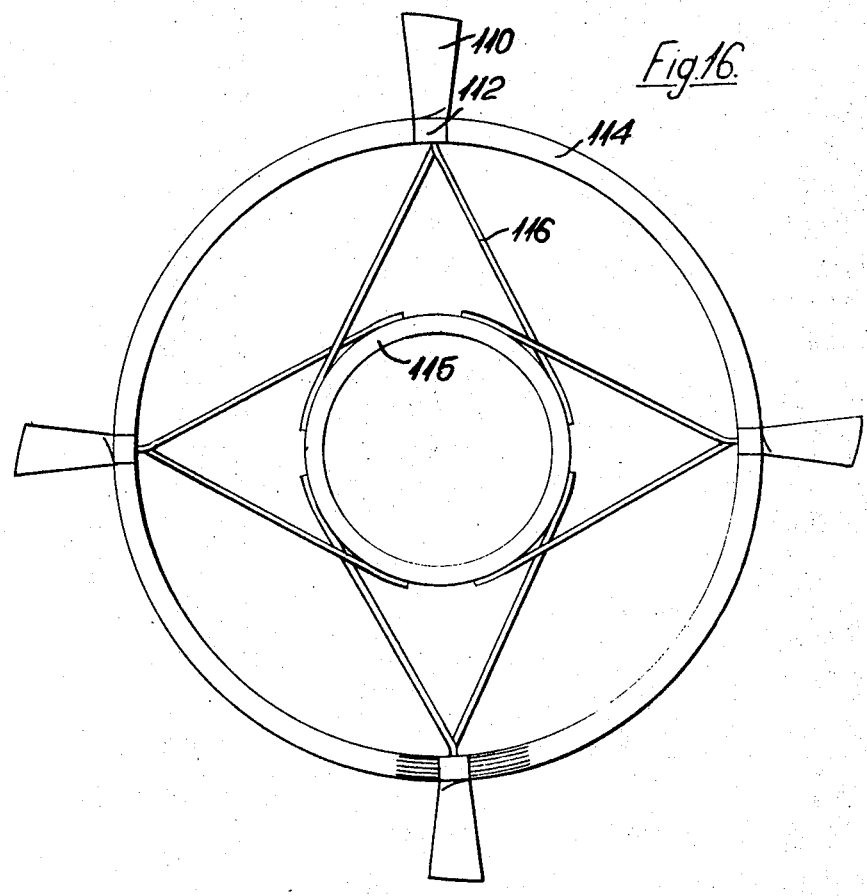
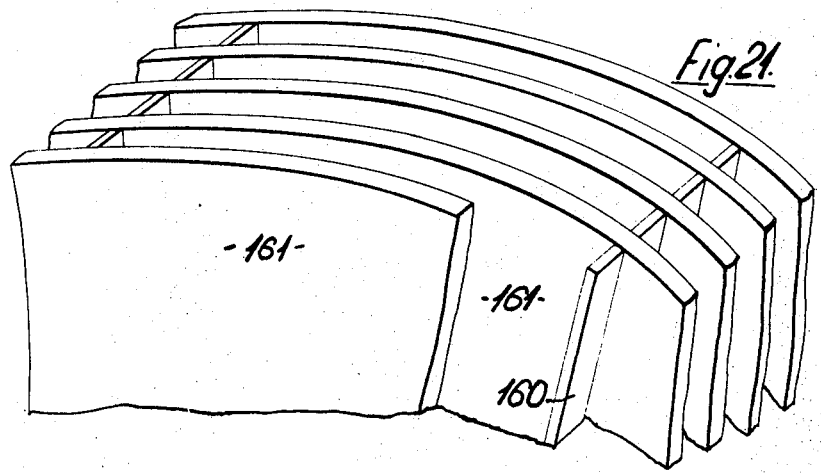

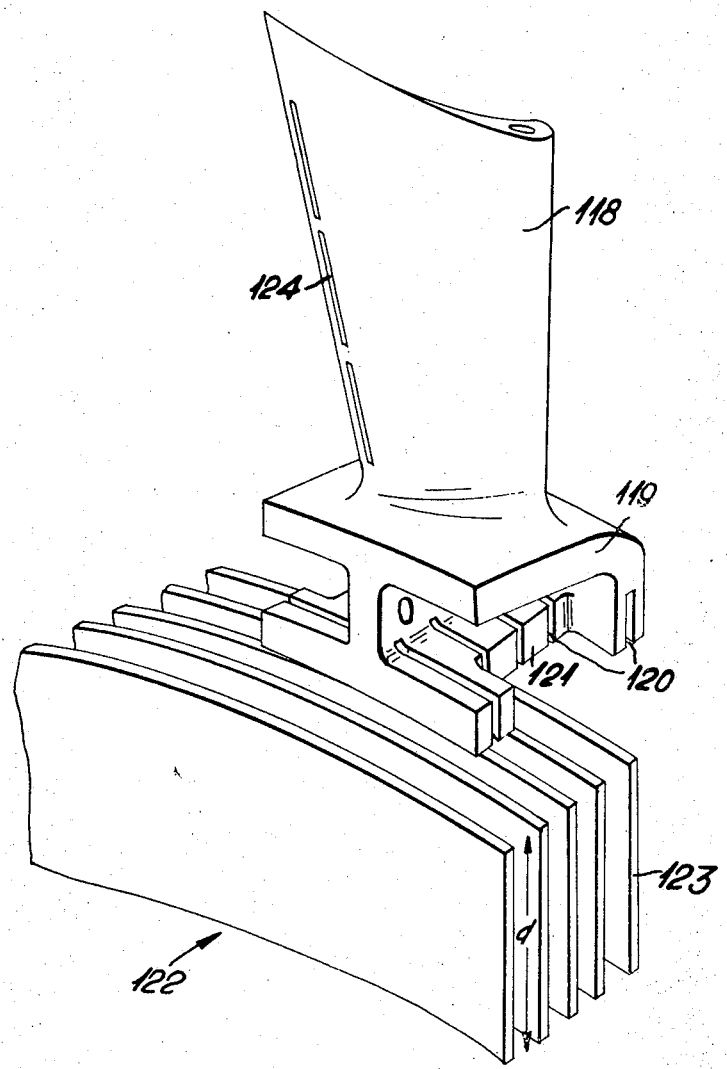

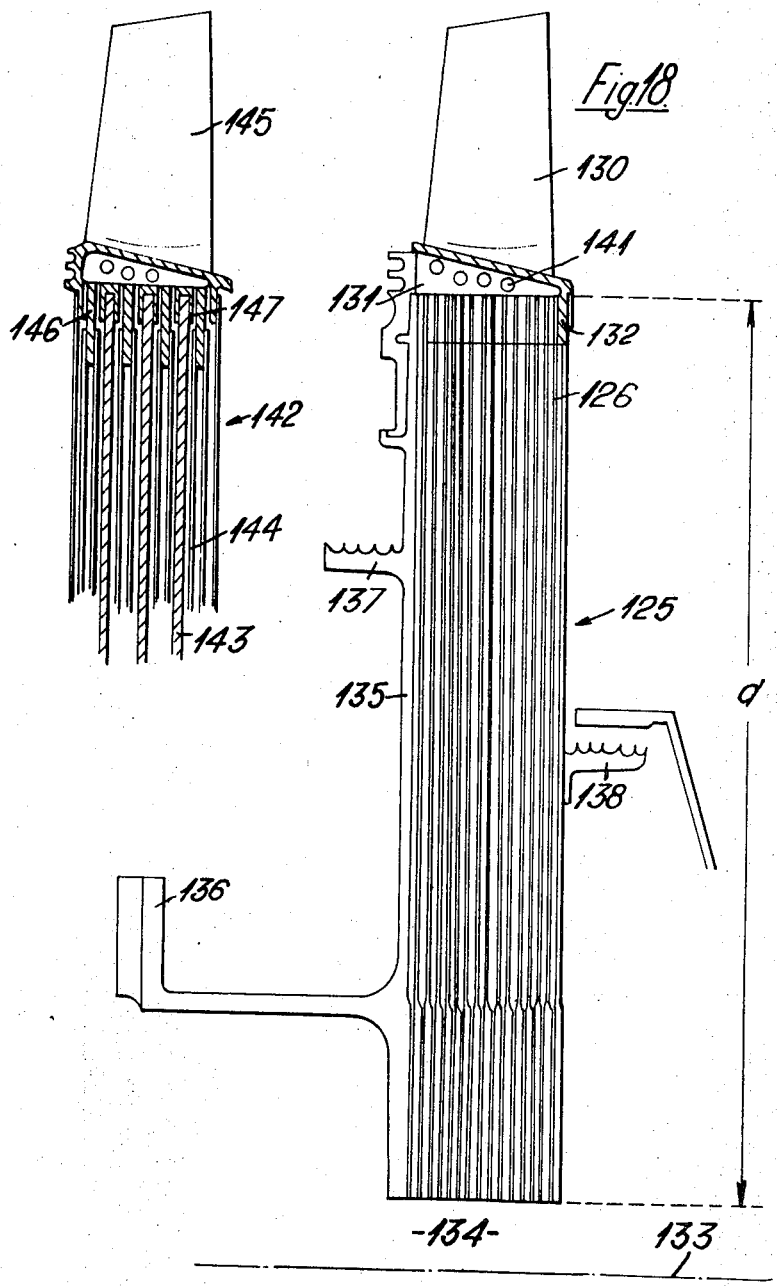

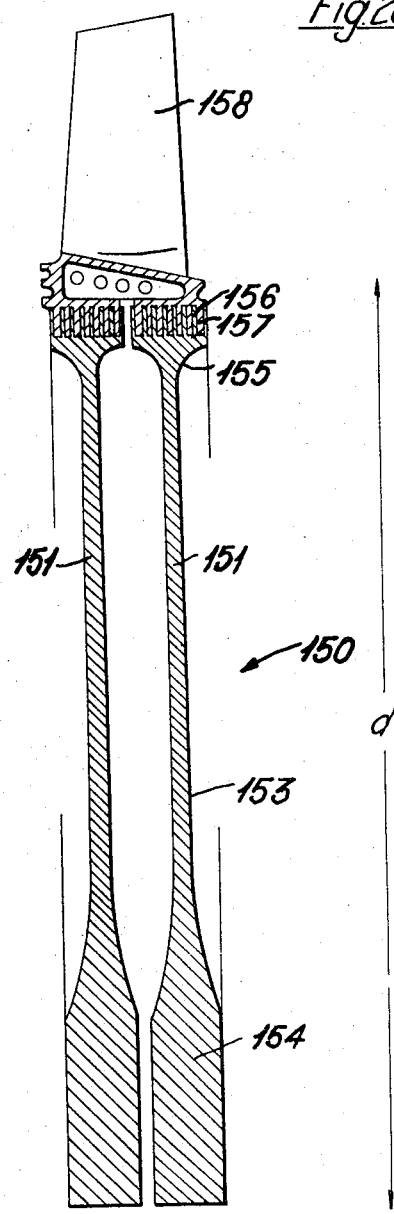

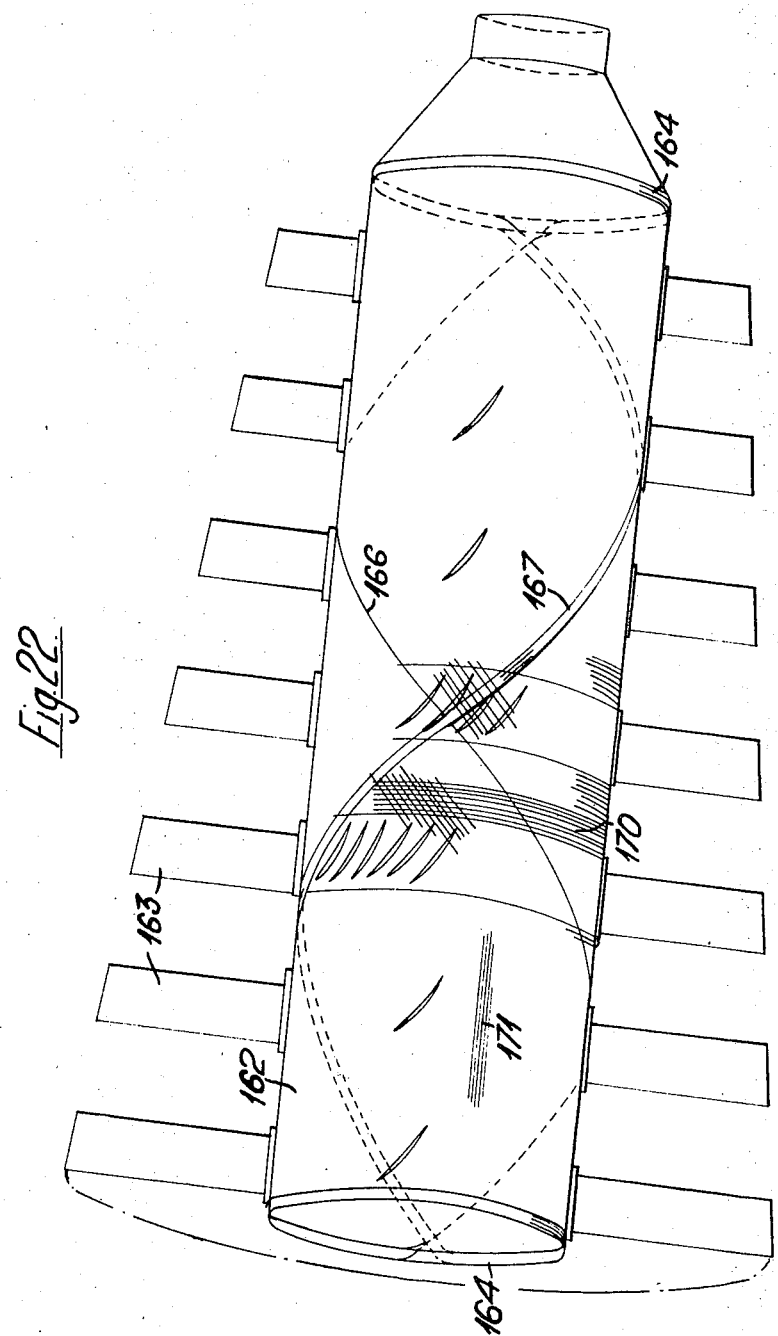

Inventors
Jack Palfreyman
Henry Edward Middleton
By
Cushman, Darby Cushman
Attorneys

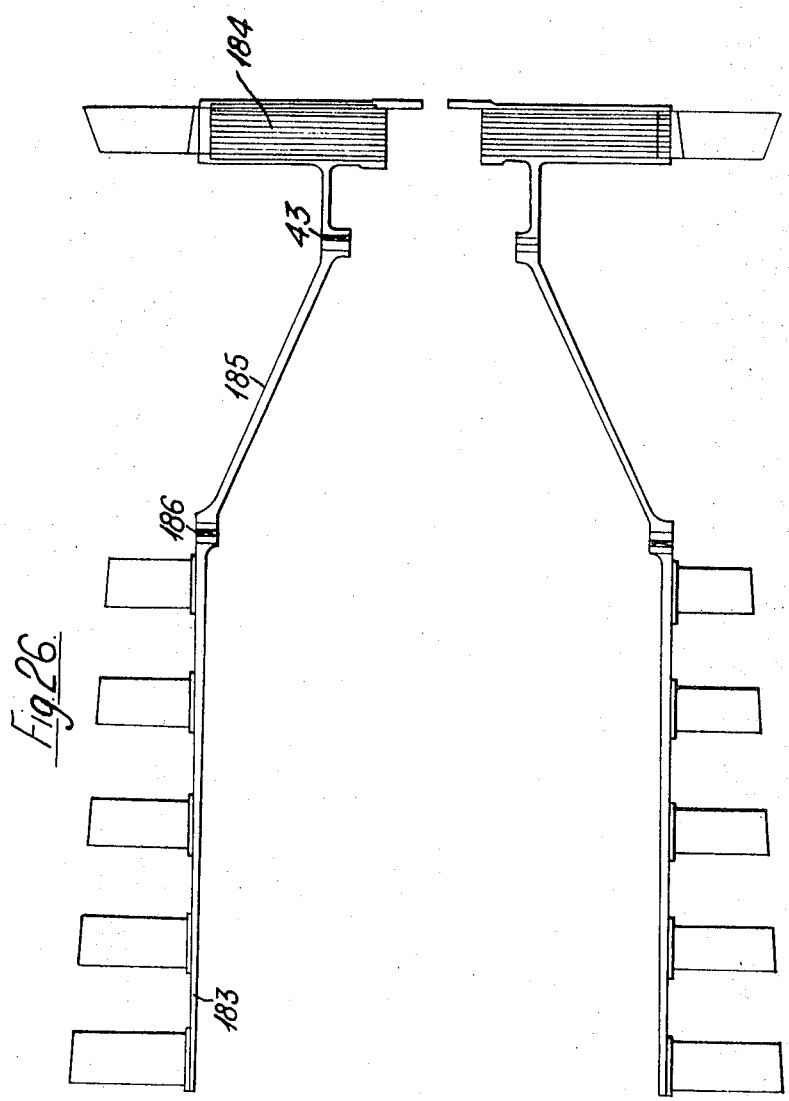

United States Patent Office 3,532,438
Patented Oct. 6, 1970

3,532,438
AEROFOIL-SHAPED BLADES, AND BLADE
ASSEMBLIES, FOR USE IN A FLUID FLOW
MACHINE
Jack Palfreyman, Tansley, near Matlock, and Henry
Edward Middleton, Derby, England, assignors to Rolls-
Royce Limited, Derby, England, a British company
Filed Nov. 20, 1967, Ser. No. 684,378
Claims priority, application Great Britain, Nov. 29, 1966,
53,459/66; Apr. 12, 1967, 16,669/67; Aug. 3, 1967,
35,593/67
Int. Cl. F01d 5/30
U.S. Cl. 416—213                                     19 Claims

ABSTRACT OF THE DISCLOSURE

A gas turbine engine rotor is provided with fibre-reinforced blades whose root portions have slots therein in which are bonded fibres extending through the rotor.

---

Figure 8:
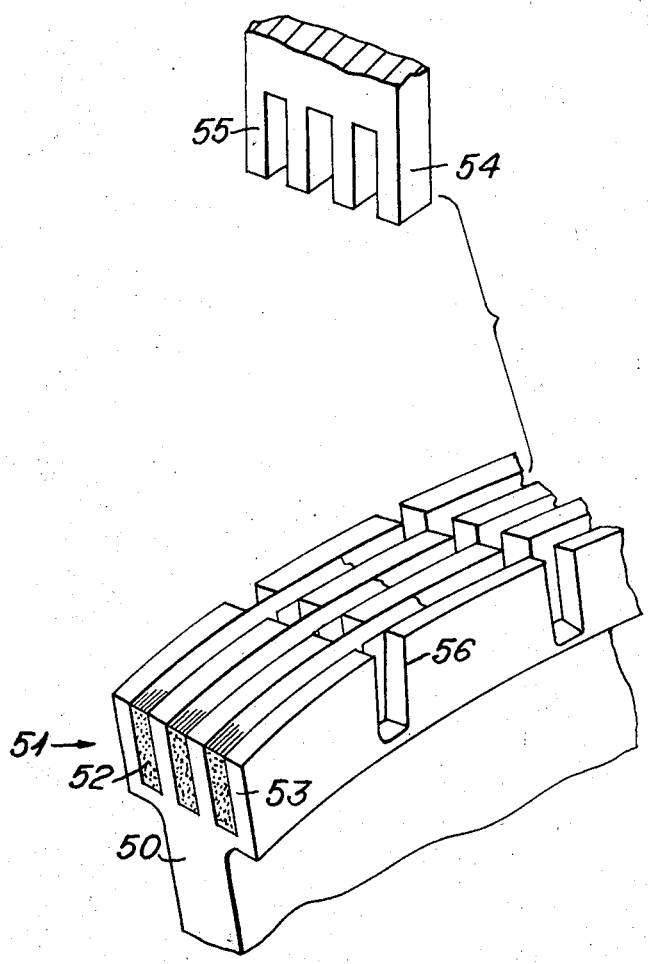

This invention concerns blade assemblies, for use in a fluid flow machine such, for example, as a gas turbine engine.

According to the present invention in its broadest aspect, there is provided a blade assembly adapted for use in a fluid flow machine comprising a fibre-reinforced rotatable support member having a plurality of axially spaced circumferentially continuous portions separated by gaps, a plurality of angularly spaced apart aerofoil-shaped fibre-reinforced blades, each of which has a root portion defined by a plurality of tangs into which the fibres of the blades extend, the tangs having slots therebetween, each said tang being mounted and shear bonded in a said gap, the fibres of the support member comprising circumferentially extending fibres in the said portions, to which are transmitted centrifugal loads from the fibres of the blades, and which withstand hoop stresses at the rim of the rotatable support member.

In another aspect, the invention provides a blade assembly adapted for use in a fluid flow machine comprising a fibre-reinforced rotatable support member having a plurality of axially spaced circumferentially continuous portions separated by gaps, a plurality of angularly spaced apart aerofoil-shaped fibre-reinforced blades, each of which has a root portion defined by a plurality of tangs into which the fibres of the blades extend, the tangs having slots therebetween, each said tang being mounted and secured in a said gap, the fibres of the support member comprising both circumferentially extending fibres, to which are transmitted centrifugal loads from the fibres of the blades, and fibres which extend in the directions of the principal tensile stresses which arise in the rotatable support member from torque loading during rotation.

The synthetic resin material is preferably reinforced with carboniferous fibres, although it may be reinforced with many other kinds of fibres e.g. silica fibres which have been coated with aluminium or with an epoxy resin.

The synthetic resin material may be an epoxy, polyimide, polyquinoxaline, polythiazole, or polybenzimidazole resin, or a ladder polymer. It should be understood, however, that the blades may be fabricated by methods for which not all these resins are suitable.

Thus thermoplastic resins, such, for example, as polymethylmethacrylate may be used for fabricating the blades, and rotatable support members therefor, by any of the methods described below, provided that the blades and support members are only used for low temperature applications such as fan blades and first stage compressor rotor blades. Similarly, thermosetting resins such, for example, as epoxy, polyester, melamine and polymethane resins may be used for fabricating the blades and support members by any of the methods described below, provided that they are either liquid in the cold uncured state or may be made liquid by a warming that is insufficient to complete the curing process.

Those thermosetting resins, such, for example, as polystyrene, which are solid in the uncured state but are soluble in certain solvents, and which can be used in the dissolved state for wetting individual fibres, rovings or sheets of fibres, are not, however, suitable for the resin injection processes described below, nor are polyimides, nor ladder polymers.

It should be understood, however, that for turbine and other high temperature applications, the material which is fibre reinforced may be a metal or alloy. Thus the fibres may be coated (e.g. by electrodeposition, spraying, or molecular deposition), with a metal or alloy.

The blades may be formed from an assembly of sheets, the individual sheets being so shaped that the said assembly has the required blade profile and is provided with the said slots and tangs.

Thus each sheet may be a sheet of fibre-reinforced synthetic resin material, the sheets being compacted together to produce the finished blade. Alternatively, each sheet may be a sheet of fibres; the sheets of fibres being placed, under tension, in a blade-shaped mould and injected with the synthetic resin material.

If desired, the or each slot in the root portion may be formed by machining the root portion of the blade after the latter has been made.

The blade may be made hollow to provide for the cooling thereof, and may be adapted for use in transpiration cooling. The blades may be made hollow by casting in wires covered with releasing agent which is removed subsequently to curing.

Means may be provided which fill or cover at least the radially outermost portions of the said gaps which are disposed between adjacent blades.

At least the said radially outermost portions of the gaps may be filled with synthetic resin material which has been injected thereinto and which is bonded both to the said annular portions and to the blades.

The said annular or disc portions may be formed by moulding fibre reinforced synthetic resin material, or alternatively by compacting together a plurality of sheets or turns of fibre reinforced synthetic resin material.

Each root portion of each blade may have bonded to each of its circumferentially opposite sides a substantially L-shaped fillet member, each fillet member having fibres which have radially extending portions which are bonded to fibres in the respective root portion, and circumferentially extending portions which are bonded to fibres in the rotatable support member, the fillet members providing the blades with additional resistance to torsional and vibrational stresses. Moreover, the blade flanks may be formed with fibres which extend at an angle to the length of the blade to give increased resistance to torsional stresses.

The axially spaced portions of the support member may comprise a group of which the end members of the group extend radially outwardly of the inner members of the group to define therewith an annular space in which the fillet members are disposed.

Each blade may be secured to at least one other blade by fibres, end portions of which are bonded within the slots in the root portions of the blades. Thus, the said fibres may form part of fibre reinforced synthetic resin tape.

Each tape may, if desired, have a curved shape between the respective root portions such that the interaction on the fibres of the end loads due to the blades and of the centrifugal loads produces minimum tension on the fibres at the designed rotational speed.

The tangs may be formed of an assembly of layers of fibre-reinforced material, the cross-sectional width of said assembly varying radially so as to reduce the formation of stress concentrations.

The gaps between the axially spaced portions may communicate with cooling passages in the blades, means being provided for passing cooling air through said gaps and into said cooling passages. Moreover, radially extending vanes may be mounted in said gaps, the said vanes, in operation, causing the compression of the cooling air passing through the gaps to be increased.

The rotatable support member may have been formed by traversing a fibre or bundle of fibres axially of the rotatable support member and simultaneously rotating the latter, whereby to produce a helical winding. Moreover, the rotatable support member may have been formed by employing an axial traversing mechanism which, at the end of each axial traverse was held stationary for a short period so that the fibre or bundle of fibres was caused to produce at least one circumferential turn. The speeds of the axial traverse and rotation may have been such that, in one direction, the fibre or bundle of fibres passed between the blade positions, and, in the opposite direction, the fibre or bundle of fibres passed between the tangs of the blade root portions.

Figure 23:
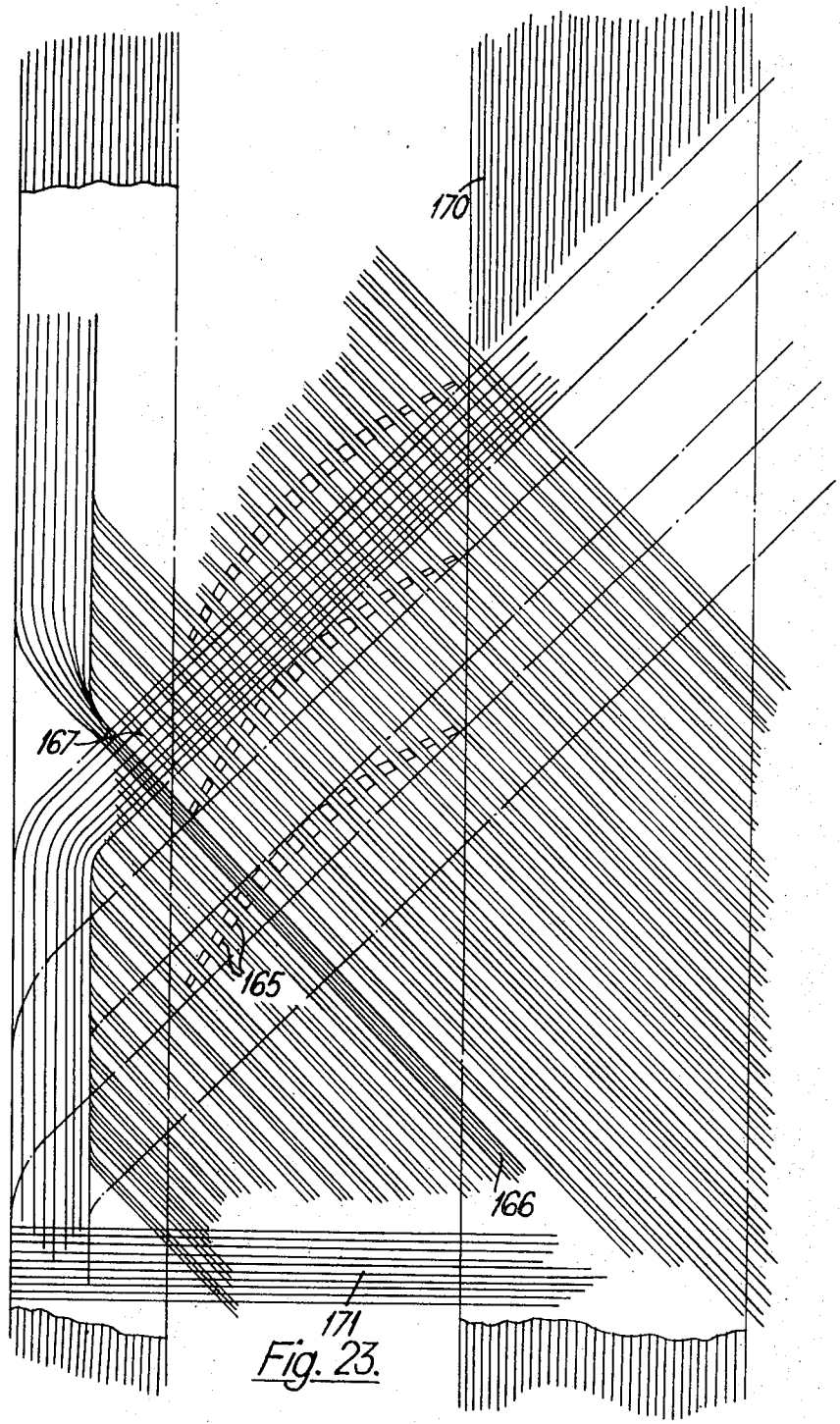

The invention is illustrated, merely by way of example, in the accompanying drawings, in which:

FIG. 1 is a perspective view of a fibre reinforced aerofoil shaped blade according to the present invention, FIG. 2 is a broken-away perspective view of a blade assembly incorporating blades of the kind shown in FIG. 1, FIG. 3 is a perspective view of a part of the blade assembly of FIG. 2, FIGS. 4 and 5 are diagrammatic perspective views illustrating alternative ways of forming annular members which form part of the construction illustrated in FIG. 2, FIGS. 6 and 7 are broken-away perspective views illustrating modified forms of blade assembly according to the present invention, FIG. 8 illustrates a mould for forming parts of a blade assembly according to the present invention, FIG. 9 is a broken-away perspective view illustrating yet another blade assembly according to the present invention, FIG. 10 is a diagrammatic view illustrating the formation of a blade support member forming part of a blade assembly according to the present invention, FIG. 11 is a diagrammatic view of a blade forming part of a blade assembly according to the present invention, FIG. 12 is a broken-away diagrammatic perspective view of still another blade assembly according to the present invention, FIGS. 13 to 16 are diagrammatic views illustrating different ways in which different blades of a blade assembly may be interconnected by fibre-reinforced synthetic resin material, FIGS. 17 to 20 are respectively diagrammatic views of further blade assemblies according to the present invention, FIG. 21 is a diagrammatic view of a part of yet another blade assembly according to the invention, FIG. 22 is a diagrammatic view of compressor having the part of the blade assembly of FIG. 21, and FIG. 23 is a diagrammatic lay-out of the fibres of the rotor of the compressor of FIG. 22, FIGS. 24 to 27 illustrate yet further blade assemblies according to the present invention.

The present invention is primarily concerned with blades, e.g. of a gas turbine engine compressor, which are formed of fibre-reinforced synthetic resin material. The synthetic resin material may be an epoxy resin, although many other resins including polyimides, polyquinoxalines and polythiazoles may be used for certain constructions of blades and blade assemblies according to the invention. The fibres used to reinforce these resins are preferably carboniferous fibres, e.g. those produced by the methods set forth in the common assignee's Rolls-Royce Limited, British Pat. No. 1,238,043. The present invention is, however, applicable not merely to such carboniferous fibres, but to many other fibres, e.g. silica fibres which have been coated with aluminium.

In FIG. 1 there is shown a rotor blade 20 which is adapted for use in a gas turbine engine compressor. The blade 20 is formed of an assembly of sheets 21 to 26, the individual sheets 21 to 26 being so shaped that the said assembly has the required blade profile.

Each of the sheets 21 to 26 may be a sheet of fibre-reinforced synthetic resin material the sheets 21 to 26 being compacted together to produce the finished blade 20.

Alternatively, each of the sheets 21 to 26 may originally be constituted by a sheet of fibres, the sheets of fibres being placed under tension in a blade-shaped mould (not shown) and injected with the synthetic resin material.

The blade 20 is provided with a root portion 30 which has a number (e.g. five as shown) of tangs 31, a slot 32 being provided between each adjacent pair of tangs 31. The root portion 30 is provided with as many tangs 31 as possible, and the latter are made as thin as possible, for reasons discussed below.

The tangs 31 may be provided by appropriately preshaping the sheets 21 to 26, or alternatively by sawing or otherwise machining the root portion 30 after the latter has been formed. The length of the tangs 31 is dictated by conditions such as the temperature, rotational speed, and mean radius of rotation at which they will be used.

The fibre reinforcement in the blade 20 is desirably interwoven in such a way as to maximise the strength which the fibres impart to the blades. Thus the fibres may be used to strength the leading and trailing edges and may be arranged at an angle to give increased resistance to torsional stresses.

In FIG. 2 there is shown a blade assembly which may form part of a gas turbine engine compressor and which employs the blades 20 shown in FIG. 1.

The said assembly comprises a rotor which includes at its periphery a number of aligned axially spaced annular members 33 which are so spaced from each other by gaps 34 as to be adapted to receive the tangs 31 of the blades 20. The annular member 33, which are shear bonded to the tangs 31, are formed of the same fibre-reinforced synthetic resin material as the blades 20.

The bond between the blades 20 and annular members 33 is such that the blades 20 transmit the centrifugal load to which they are subjected to the annular members 33. Thus the larger the number of thin tangs 31, the greater will be the shear area between the tangs 31 and the annular members 33 with the result that the depth of the tangs 31 may be reduced.

The radially outermost portions of the gaps 34, which are disposed between adjacent blades 20, are covered by plates 35. The plates 35 thus prevent the working fluid passing through the engine from entering the gaps 34, since this would be undesirable for aerodynamic reasons. The plates 35 may, as shown in FIG. 3, have integral radially extending bars 36 which are disposed immediately adjacent to and on opposite sides of the tangs 31. Such bars assist in transmitting the loads to which the blades 20 are subjected to the annular members 33, although in many cases it may not be necessary to provide such integral bars 36 on the plates 35.

The plates 35 may be formed of fibre-reinforced synthetic resin material which is shear bonded to the periphery of the annular members 33 and to the blades 20. If the plates 35 are provided with bars 36, these may also be bonded to the tangs 31.

Alternatively, the plates 35, with or without their bars 36, could be formed of foamed synthetic resin material, foamed ceramic material, or of other low density material.

Alternatively, instead of employing plates 35, synthetic resin material may be injected into the gaps 34 so as either to fill the whole of the portions of these gaps between adjacent blades 20 or at least to fill the radially outermost portions thereof. Such synthetic resin material will be bonded both to the annular members 33 and to the blades 20. Such injected synthetic resin material, like the plates 35, may have integral radially extending bars which are disposed immediately adjacent to and are bonded to the tangs 31 of the root portions of the blades 20.

Such injected synthetic resin material will stiffen the annular members 33, will bond the tangs 31 thereto so as to assist in transmitting the centrifugal load of the blades to the annular members 33, and will provide covers performing an equivalent function to the plates 35. Such injected synthetic resin material also assists in counteracting the couple which is applied to the blades 20 by the gas loads acting thereon. The blades are thus more resistant to torsional and vibrational stresses produced by such a coupling.

It is preferred that the injected synthetic resin material, while filling the radially outermost portions of the gaps 34 and also the radially extending portions of these gaps immediately adjacent to the tangs 31, will not fill the remainder thereof, whereby to reduce the weight of the structure. Such limited injection of synthetic resin material may be achieved by placing members (not shown) coated with release agents in those parts of the gaps 34 which it is not intended to fill with resin.

The annular members 33 may be formed by moulding fibre-reinforced synthetic resin material in an appropriately shaped mould (described below with reference to FIG. 8). Alternatively, they may, as illustrated diagrammatically in FIG. 4 be formed by compacting together a number of sheets 37 of fibre-reinforced synthetic resin material.

Yet again, as shown in FIG. 5, each of the members 33 may be formed by compacting together a number of turns 40 of a fibre-reinforced synthetic resin tape 41.

The turns 40 or sheets 37, are not necessarily continuous, since the tape 41 or sheets 37 could be constituted by a number of portions whose end parts suitably overlap each other and still retain the strength of continuous fibres.

The members 33 when formed as shown in FIG. 4 or FIG. 5 will require final curing in the mould, the members 33 being held to remove slack before curing.

The blades 20 and annular members 33, after being formed by any of the methods discussed above, are assembled into a mould (e.g. as described below with reference to FIG. 8), and are resin injected and cured. If infilling material (not shown) is employed, it need not be introduced until this stage.

As will be appreciated, this will mean that at least some of the resin will have been heated more than once, but this is not of importance.

If one of the blades 20 in such an assembly should require replacement, then, the tangs 31 of the blade which is to be removed can be machined away with a saw wheel. A new blade may then be inserted and secured in position by injecting resin and curing.

If the blades 20 are close pitched circumferentially, a fine "dental" drill may, moreover, be used to remove the tangs of the respective blades.

In FIG. 6, there is shown part of a gas turbine engine compressor having blades 20 and annular members 33 formed by any of the methods discussed above or below. The annular members 33 of the FIG. 6 construction are assembled to form a compressor shaft 43 which has a slight taper in an upstream direction.

At least some of the annular members 33 have circumferentially extending fibres 44 which are bonded on the top of fibres 45 which are disposed at an angle of substantially 45° thereto. The fibres 44 assist in taking the centrifugal loads, while the fibres 45 assist in taking tension loads due to torsion in the shaft 43.

If desired, the fibres employed in the shaft 43 can be. wound in the manner of an electrical armature or can, alternatively, be arranged to extend at 45° to the axis of the shaft 43.

The shaft 43 has a frusto-conical portion 46 at its downstream end where it may be bonded to a "Curvic" coupling (Registered Trademark).

In FIG. 7 there is shown an arrangement generally similar to that of FIG. 6 and which will not therefore be described in detail. In the FIG. 7 arrangement, however, the annular members 33, which have radially extending fibres, are bonded to a separate shaft 47.

In FIG. 8 there is shown a mould 50 having a peripheral portion 51 which is divided by slots 52 into a plurality of aligned axially spaced annular portions 53. Thus, where there are to be used blades 54 as shown, which have four tangs 55 at their root portion, there will similarly be four annular portions 53.

Each of the annular portions 53 is provided with a plurality of angularly spaced apart slots 56 for the reception of the tangs 55.

The slots 52 between the blades 54 are then filled with fibre-reinforced synthetic resin material, the blades 54 being bonded to the annular members formed in the slots 52. The synthetic resin material in the gaps 52 may, alternatively, be foamed.

In FIG. 9 there is shown a blade assembly comprising a rotor 60 provided with a plurality of angularly spaced apart blades 61 (only one shown). Each of the blades 61 is formed of a plurality of spaced apart layers 62 of fibre-reinforced synthetic resin material, the layers 62 in the root portion of each blade forming tangs with slots therebetween.

The rotor 60 is formed of a plurality of axially spaced apart annular layers 63 of fibre-reinforced synthetic resin material which are bonded to the layers 62.

The spaces between the layer 62 may, as shown, be filled with layers 64 of fibre-reinforced synthetic resin material or with other in-filling material. Similarly, the spaces between the layers 63 may be filled with such infilling material or, as shown, with part-annular layers 65 of fibre-reinforced synthetic resin material which extend between adjacent layers 62 of the blades 61.

The whole assembly shown in FIG. 9 may be formed by positioning the layers 62 to 65 appropriately, and curing the assembly in a mould.

FIG. 10 illustrates a rotor disc 66 having tangs 71 of a blade root held in position therein. The top portion of FIG. 10 constitutes a section through the lower part of a blade showing the blade as having a hollow centre 68 with all thicknesses 69 on either side thereof.

The tangs 71 fit into correspondingly shpaed recesses in the outer circumference of the rotor disc 66 which is shown very diagrammatically in FIG. 10. Only two tangs 71 are shown, but it is to be understood that there are many tangs along the length of the blade. The motor disc 66 has a radially inner portion 67 which is formed of synthetic resin material and which may have a centrally disposed recess 70 as shown. This allows for the supply of cooling air thereto.

The tangs 71 are made up of layers of fibre-reinforced synthetic resin material which overlap each other in such a way that their cross-sectional width varies radially so as to reduce the formtion of stress concentrations. The thickness of the various layers is desirably of the order of 0.005" to facilitate manufacture.

In FIG. 11 there is shown, very diagrammatically, a blade 72 which is formed of a number of layers 73 of fibre-reinforced synthetic resin material. The blade 72 is shown as being bonded to a rotor 74 of fibre-reinforced synthetic resin material, the layers 73 overlapping with each other in such a way as to provide the blade 72 with a number of tapered tangs 75 (only one shown) with slots (not shown) therebetween.

In FIG. 12 there is shown yet another blade assembly employing blades 94 whose root portions 95 are formed into a plurality of tangs 96 with slots 97 therebetween.

Each of the blades 94 is secured to other blades 94 by means of fibre-reinforced synthetic resin tapes 100. Each of the tapes 100 has end portions which are bonded within the slots 97 of the root portions 95 of the blades 94 interconnected thereby. The assembly of the various tapes 100, which extend between the various root portions, forms a thin rotor disc 101. As will be appreciated, due to the overlapping of the various tapes 100, the disc 101 will be thicker adjacent its centre than at its periphery, and the slots 97 are therefore shaped correspondingly.

As with the other constructions, the blades 94 could be interconnected by fibres which are thereafter embedded in synthetic resin material.

Any spaces between the fibres of the disc 101 will need to be filled, to maintain the pressure difference across the disc.

The rotor disc 101 is provided with a central hole (not shown) to enable a stabilising means to be introduced which will stabilise the positions of the fibres of the disc. The diameter of the hole will be determined by the number of blades 94, the rotational speed of the assembly, the centrifugal loads to which the blades 94 are subjected, the thickness of the fibres, and so on.

The assembly shown in FIG. 12 can be resin injected in a mould and cured with the possible inclusion of members (not shown) covered with a releasing agent to provide cavities which can subsequently be replaced by low density in-filling material to provide damping if necessary.

As shown in FIG. 13, tapes 104 may be employed each of which, in passing from the slots 95 of one blade 94 to the next, has a catenary or other curved shape. The curved shape should ideally be such that the centrifugal force on the fibres of the tape 104 is offset by the radially inward load thereon.

Alternatively, as shown in FIG. 14, tapes 105 may be employed which, in extending from one blade 94 to the next, may traverse substantially straight paths. In this case, the rotor disc is preferably provided with a number of annular members 106 of fibre-reinforced synthetic resin material to which some of the centrifugal loads carried by the tapes 105 will be transmitted, the annular members 105 being bonded within recesses 106 in the root portions 95 of the blades 94.

Figure 15:
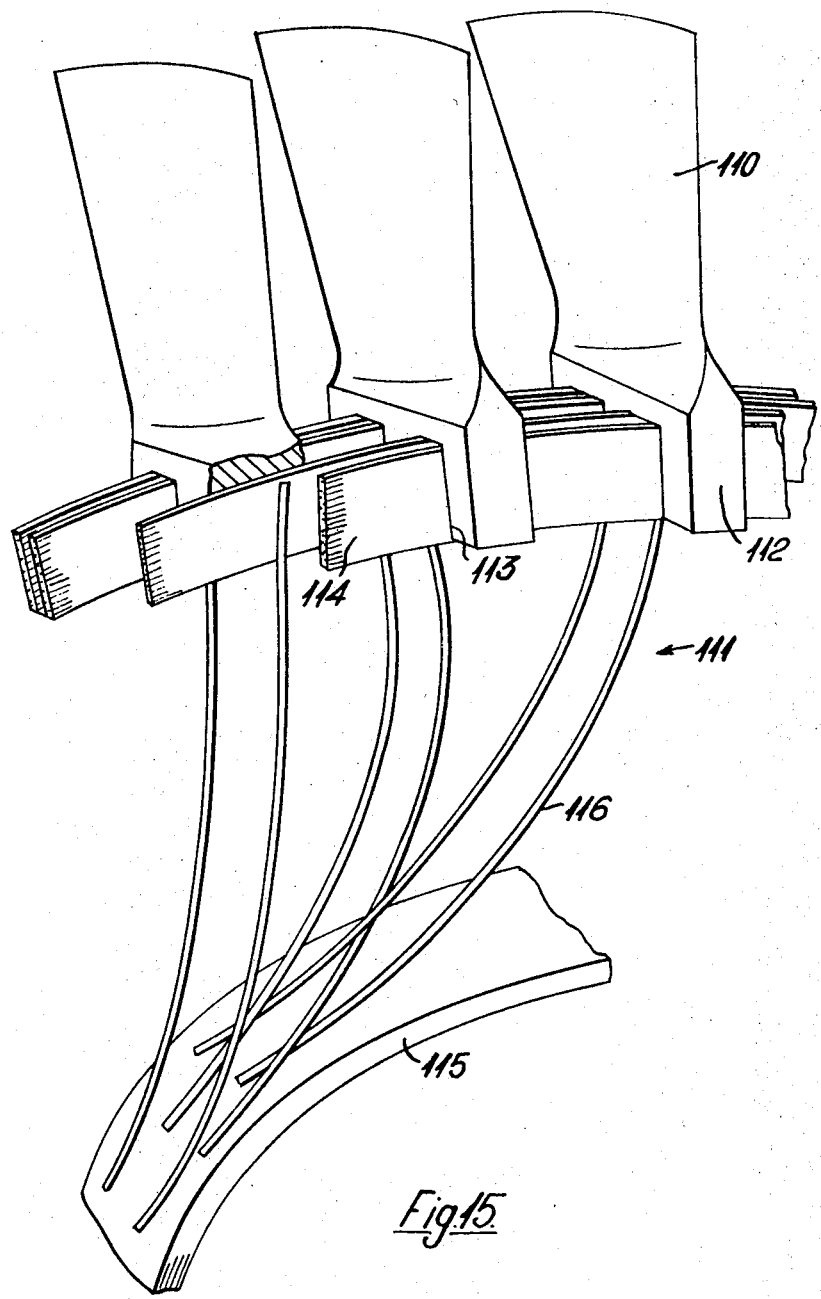

In FIG. 15 there is shown a blade assembly having blades 110 of fibre-reinforced synthetic resin material which are carried by a rotor 111. The blades 110 have root portions 112 which are formed with slots 113 within which are bonded annular members 114 which form part of the rotor 111 and which are formed of fibre-reinforced synthetic resin material.

An annular hub member 115, which is formed of a number of layers of fibre-reinforced synthetic resin material, is disposed centrally of the rotor 111. Fibres 116, which are embedded in synthetic resin material (not shown) are bonded to the annular members 114, at points adjacent the root portions 112, so as to extend therefrom in a generally radial direction, and are also bonded to the annular hub member 115 so as to extend tangentially therefrom.

Thus each of the blades 110 is, in effect, connected to another blade by way of the fibres 116 and annular hub member 115, the annular hub member 115 serving to stabilise the positions of the fibres 116. Put another way, the use of the annular hub member 115 obviates the need for the fibres 116 to extend completely between oppositely disposed blades.

FIG. 16 illustrates a blade assembly which is generally similar to that of FIG. 15. In the FIG. 16 construction, however, the fibres 116 follow a substantially linear path, whereas in the FIG. 15 construction they follow a curved path.

Although the constructions described above are intended primarily for use in compressors, they may also be used in the turbines of gas turbine engines provided, of course, suitable materials are selected.

FIG. 17 is an exploded view of a blade assembly comprising fibre-reinforced blades 118 (only one shown) each of which has a root portion 119 in which a plurality of slots 120 are formed with tangs 121 therebetween. The blade assembly also comprises a rotor 122 which is made up of a plurality of spaced apart discs 123 the outer periphery of each of which is received in and is brazed, welded or resin bonded, in slots 121 of the blades 118.

If the rotor 122 is a compressor rotor, the discs 123 may be thin annular members having a relatively small radial depth $d$ compared with the diameter of the rotor 122, and in fact the radial depth $d$ is preferably the same as the depth of the slot 120 in the blade root portion. Thus where the compressor comprises a multistage axial flow compressor, each of the axial stages may comprise a disc 123 and the stages may be joined by interposing between each disc 123 an annular spacer member (not shown) to which the respective discs 123 are connected, thereby forming a drum construction for the compressor. The spacer members may be filament wound from fibrous material the fibres lying at approximately 45 degrees to the axis of the compressor. In such an application to compressors, the blades and discs of at least the first stages of the compressor may be fabricated from fibre reinforced thermosetting resins, and in fact the whole of the compressor may be made of such material provided a high temperature resistant resin is used.

A blade 118 for such a compressor need not be provided with cooling passages therein and would normally be a solid blade, but for a turbine application it would be essential to provide cooling passages such as passages 124 as shown in FIG. 17.

FIGS. 18 to 21 show blade and rotor assemblies more suited for use in high temperature applications, for example, as turbine blade and rotor assemblies or for use in the final stages of compressors.

FIG. 18 shows a rotor 125 comprising a plurality of separate relatively thin discs 126 which are axially spaced from one another. A plurality of blades 130, having root portions 131 with slots 132 formed therein, are mounted on the radially outer periphery of the discs 126, one disc being fitted into each one of the slots 132, and attached thereto, by brazing, welding, diffusion bonding or any suitable process depending on the material used. For a turbine rotor application, the blades and rotors may be made from fibre reinforced metals e.g. titanium or nickel based alloys. For example, a nickel-chromium matrix may be reinforced with nickel-chromium plated carbon fibres. Each disc may be woven from the fibrous material so that each blade 130 is attached to at least one blade 130 on the opposite side of the axis 133 of the disc.

The discs in the FIG. 18 construction have a relatively large radial depth $d$ leaving only a relatively small aperture 134 at the centre. The width of each of the discs 126 is increased at the radially inner end to strengthen the support for those parts of the blades and discs which lie outside the free hoop radius.

That is to say, when a cylinder is rotated about its longitudinal axis at increasing speeds, there will be a speed, depending on the radius of the cylinder, at which the cylinder will cease to be self-supporting and will burst. The radius of the cylinder at this speed is known as the free hoop radius. For any rotor disc, therefore, which is designed to rotate at a given speed, there will exist a free hoop radius and any metal of the disc lying outside the free hoop radius is not self-supporting and has to be supported by additional metal within the free hoop radius. In the case of the construction of FIG. 18, the free hoop radius of the turbine disc 126 would lie somewhere between the seals 137 and 138 and, therefore, the metal lying radially outwardly of this radius, which includes the blades, is supported by the material at the radially inner part of the disc, where the thickness is increased. In order to keep the thickness increase to a minimum, the radial depth of metal inside the free hoop radius is preferably kept as large as possible and, therefore, the hole 134 through the centre of the disc is kept as small as possible.

An end plate 135 is attached to one of the axially outermost of the discs 125, and a coupling 136 (which may be of the type sold under the Registered Trademark "Curvic") is provided thereon by which the driving forces from the rotor may be transmitted to a shaft (not shown).

Sealing members 137 and 138 are provided on the end plate 135 and on the oppositely disposed outermost disc 126 respectively, said sealing members 137 and 138 being arranged to seal at different radial heights on opposite sides of the rotor. This assists in balancing out the thrust loads on the rotor which are caused by the different gas pressures prevailing on opposite sides of the rotor. It is to say, the arrangement of the sealing members 137, 138 is such that the said different gas pressures respectively act over differing areas on the opposite sides of the rotor.

The blades 130 are made hollow and thus cooling air may be passed through the spaces between the thin discs 126 and through holes 141 in the blade root portions to the interior of the blade, thereby providing cooling of both the blades and the rotor.

In an alternative construction as shown in FIG. 19, the rotor 142 comprises a plurality of relatively thin discs of which some discs 143 are thicker than other discs 144.

A plurality of blades 145 are mounted on the radially outer periphery of the rotor by means of tangs of which some tangs 146 are thicker than other tangs 147. The arrangement is such that there are two of the thin discs 144 between each of the thicker discs 143. Each of the thicker discs 143 is attached in radially overlapping relationship to two of the thin tangs 147, one on each side of the disc 143, and the two thin discs 144 between the thicker disc attached in radially overlapping relationship one on each side of one of the thicker tangs 146. By this means a cooling air path is available inside the root of the blade itself and thus provides more efficient cooling of the whole rotor.

The remainder of the construction of the assembly of FIG. 19 is the same as that of FIG. 18 and hence is not described.

A further embodiment of the invention is shown in FIG. 20 in which a rotor 150 comprises two discs 151 each having a central aperture 152 and having a relatively thin portion 153 which increases in thickness at both the radially inner end 154 and the radially outer end 155. At the end 155 there are provided a plurality of projections 156 on the radially outer periphery of each disc, the projections being adapted to be received in corresponding slots formed in root portion 157 of each of a plurality of blades 158. The disc thickness at the end 154 is increased so that those parts of the disc and blades which are outside the free hoop radius of the disc may be adequately supported.

In FIG. 21 a variation is shown which may be applied to any of the constructions shown in FIGS. 17 to 20, and wherein radial, or substantially radial, vanes 160 are disposed between discs 161 so that cooling air passing therebetween will be compressed by the action of centrifugal forces. Thus cooling air, which was originally at a lower temperature and pressure, (e.g. by being divided from a low pressure compressor) may have its compression, and hence its cooling efficiency, increased, by the effect produced by the radial vanes 160. The vanes 160 also, of course, provide axial support for the discs 161.

In FIG. 22 there is shown a blade assembly according to the present invention which comprises a compressor drum rotor 162 provided with fibre-reinforced rotor blades 163 whose root portions are formed, e.g. as shown in FIG. 1 with a plurality of slots (not shown) with tangs therebetween.

The rotor 162 is wound continuously on a former (not shown) from a fibre or bundle of fibres. This is effected by rotating the former (by means not shown) and simultaneously traversing the fibre (by means not shown) backwards and forwards axially along the former thus producing a helical winding the angle of which is arranged to extend in the directions of the principal tensile stresses which will be produced in the rotor on rotation due to torque loading.

The fibres of the rotor 162 are coated during the winding process with a resin or a metal, depending on the temperature at which the rotor is to operate, and any compressive loads arising during rotation of the rotor are taken in the metal or resin matrix so formed.

The ends of the rotor 162 are reinforced with circumferential fibres 164 by allowing the traversing means to dwell at the end of each traverse, and this also provides a means of anchoring the fibres while the direction of the winding is changed.

In order to effect the weaving of the rotor 162 and the subsequent removal of the former, the former is made slightly tapered and covered with a releasing agent to prevent deposition of the material of the matrix on its surfaces. In order to provide holes for the tanged roots of the blades, pegs 165 (FIG. 23) may be inserted into the former at the required positions of the holes, the pegs 165 being provided with a releasing agent to prevent the bonding of the resin or metal matrix thereto and to facilitate their subsequent removal from the rotor.

During the weaving process, fibre portions 166, which pass from the upstream to the downstream end of the rotor, are made to pass between the positions of the blades 163, while fibre portions 167 passing from the downstream to the upstream end of the rotor have an opposite helix angle. The fibre portions 167 pass across several blade positions and are disposed between the pegs 165 so that ultimately they will lie between the tanged root portions of the blades.

The rotor 162 may be reinforced with circumferentially extending fibres 170 at positions where centrifugal loading causes high hoop stresses. Moreover, layers of axially disposed fibres 171 may be wound on to the rotor 162 in order to withstand the bending stresses which occur during rotation. By a careful assessment of the magnitudes and directions of the operating stresses of the rotor 162, the numbers and directions of respective layers of fibres may be kept to a minimum to provide a rotor of maximum strength and minimum weight.

FIG. 23 shows in more detail the lay-out of the fibres 166, 167, 170, 171 and illustrates how the fibre portions 166 may be bunched together.

If desired, the speed of the said traversing means and/or of the rotation of the former may be varied so that the fibres may be wound at varying angles.

The rotor may have a conical portion formed by winding the fibres in layers, and terminating the axial traverse at different points along the axis of the said portion.

Since the rotor 162 is a compressor rotor which will therefore be subjected to relatively low temperatures, the fibres 166, 167, 170, 171 may be coated with resins such for example, as epoxy, polyimide, polyquinoxaline, polythiazole and polybenzimidazole resins or with ladder polymers.

The construction shown in FIGS. 22 and 23 could be applied to turbine rotors which operate at relatively high temperatures, and in this case the fibres may be coated with a metal or a metal alloy, for example nickel, chromium, niobium, tantalum or an alloy of nickel and chromium. Carbon fibres may even be coated with carbon.

The fibre itself may be carbon, boron or silica.

In the case of metal coated fibres the fibres may be coated with metal simultaneously with the winding process in an electrolytic process, or alternatively the metal may be sprayed on its molten state.

Figure 24:
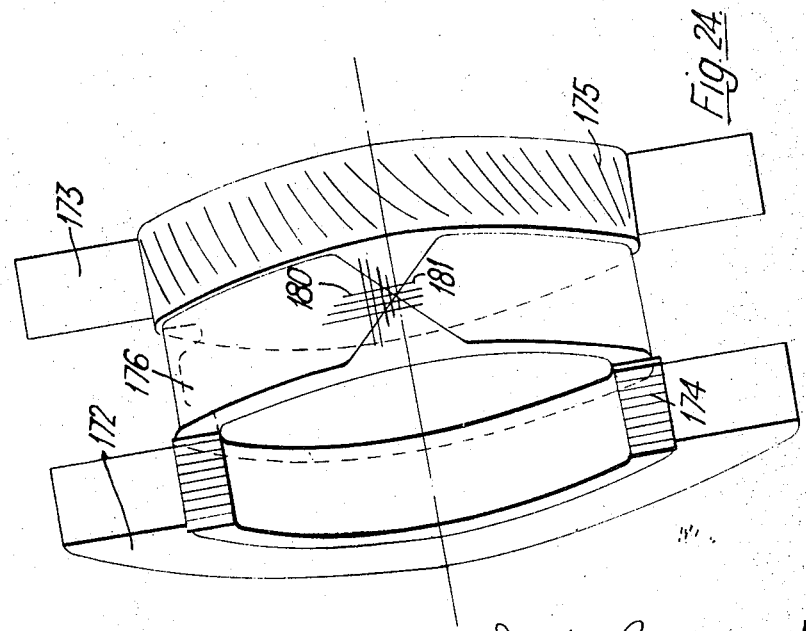

In the blade assembly shown in FIG. 24, rings 172, 173 of fibre-reinforced blades, which, as shown for instance in FIG. 1, have root portions provided with a plurality of slots (not shown) with tangs (not shown) therebetween, are carried respectively by fibre-reinforced annular members 174, 175. The annular members 174, 175 are joined in an axially spaced apart relationship by an annular spacer 176 formed from fibre reinforced metal or resin matrices. The fibres of the annular spacer 176 being orientated so as to lie along the directions of the principal stresses as hereinbefore described. The annular spacer 176 may be reinforced with circumferential fibres 180 and axial fibres 181 to withstand hoop stresses and bending stresses as before.

Figure 25:
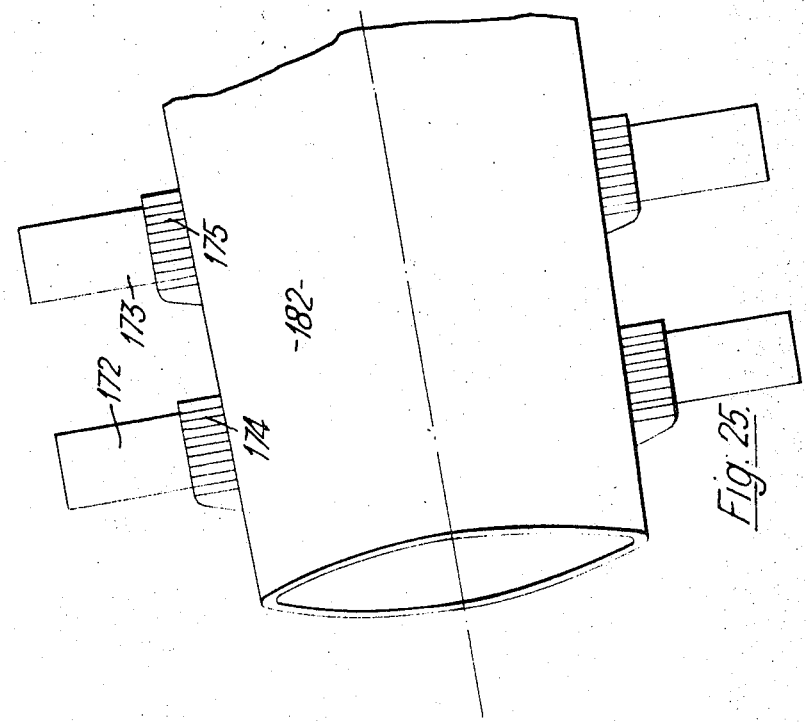

The embodiment shown in FIG. 25 is generally similar to that of FIG. 24 and will not therefore be described in detail, similar reference numerals being used to indicate similar parts. In the FIG. 25 embodiment, however, the annular members 174, 175, instead of being interconnected by the annular spacer 176, are bonded onto a rotor 182. The rotor 182 which may be formed by filament winding fibre elements in a helical pattern, may also be reinforced with circumferential and axial fibres.

In the blade assembly shown in FIG. 26, a bladed rotor 183, which may be formed as in FIGS. 22 and 23, or as in either FIG. 24 or 25, is driven from a turbine 184 by means of a frusto-conical member 185 which may be formed of filament wound fibres. The frustoconical member 185 drives the rotor 183 by way of a coupling 186 which may be of the type sold under the Registered Trademark "Curvic."

Figure 27:
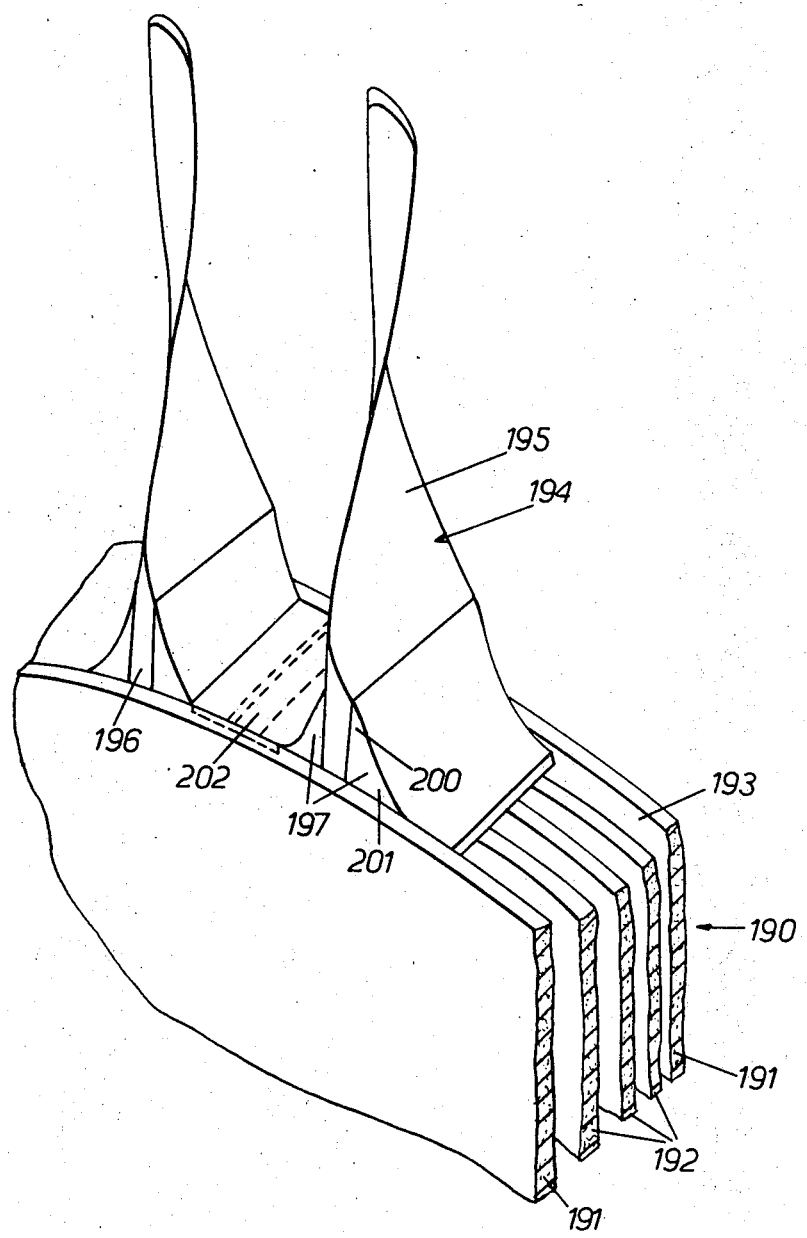

In FIG. 27 there is shown a blade assembly comprising a bladed rotor 190 of fibre reinforced synthetic resin material which may be regarded as a modification of that shown in FIG. 2 and may therefore be made in a generally similar way.

The bladed rotor 190 includes at its periphery a group of aligned, axially spaced annular members 191, 192 of which the end members 191 of the group extend radially outwardly of the inner members 192 of the group so as to define therewith an annular space, or "well," 193.

The bladed rotor 190 carries a plurality of angularly spaced apart blades 194 of fibre-reinforced synthetic resin material, the blade flanks 195 being composed of sheets of fibres in which the fibres are arranged to lie at an angle to the length of the blade to give increased resistance to torsional stresses.

The blades 194 have root portions 196 which extend into the annular space 193 and which have a plurality of slots (not shown) therein with tangs (not shown) therebetween, the said tangs being mounted and secured in the gaps between the annular members 191, 192. Each of the root portions 196 has bonded to each of its circumferentially opposite sides a substantially L-shaped fillet member 197 of fibre-reinforced synthetic resin material, each L-shaped fillet member 197 being disposed within but projecting radially outwardly of the annular space 193.

The fibres in each L-shaped fillet member 197 run from the radial "leg" 200 thereof, i.e. the portion adjacent the respective root portion 196, to the circumferential "leg" 201 thereof, i.e. the portion adjacent the annular members 192, in a large radius. The fibres in the said radial leg 200 are bonded to and are arranged to lie in overlapping relationship with the fibres in the root portions 196, while the fibres in the said circumferential leg 201 are bonded to and are arranged to lie in overlapping relationship with the fibres at the circumference of the annular members 192. Thus the L-shaped fillet members 197 provide the blades with additional resistance, at the root portions 196, to torsional and vibrational stresses.

Any portions of the annular space 193 which are not occupied by the root portions 196 and by the L-shaped fillet members 197, may be filled with fibre-reinforced resin 202 or alternatively with additional sheets or tapes (not shown) of fibres which are embedded in resin. The fibres of these additional sheets or tapes may either extend circumferentially or may lie at an angle to the circumferential direction so as again to provide additional resistance to torsional and vibrational stresses.

We claim:

1. A blade assembly adapted for use in a fluid flow machine comprising: a fibre-reinforced rotatable support member having a plurality of axially spaced circumferentially continuous portions separated by gaps, said support member having circumferentially extending fibres at least in said portions for resisting hoop stresses at the rim of said rotatable support member; and a plurality of angularly spaced apart fibre-reinforced blades, each of said blades having a root portion defined by a plurality of tangs having slots therebetween, each of said blades having fibres therein which extend into said tangs, each of said blades being mounted on said support member with each of the tangs in its root being in one of said gaps and shear bonded to adjacent circumferentially continuous portions of said support member, whereby centrifugal loads to which said blades are subjected are transmitted by fibres in the tangs of the blades to the circumferentially extending fibres in said portions of said rotatable support members.

2. A blade assembly as claimed in claim 1 wherein members are provided between the blades at the rim, said members being shear bonded to the blades and to the axially spaced portions between the blades, assisting in transmitting said centrifugal loads from the blades to the circumferentially extending fibres.

3. A blade assembly as claimed in claim 1 comprising filling means which are shear bonded to the blades and to the said axially-spaced portions between the tangs of adjacent blades, said tangs and filling means completely occupying the circumferential extent of the gaps whereby the rotatable support member has a continuous rim in which the circumferentially extending fibres withstand said hoop stresses.

4. A blade assembly as claimed in claim 3, wherein the filling means completely fills those parts of the gaps which are not occupied by the tangs.

5. A blade assembly as claimed in claim 1, in which the blade flanks are formed with fibres which extend at an angle to the length of the blade to give increased resistance to torsional stresses.

6. A blade assembly as claimed in claim 1, comprising means bonded to the blades and to regions of said annular portions circumferentially between adjacent said blades, said means providing the blades with additional resistance to torsional and vibrational stresses.

7. A blade assembly as claimed in claim 1 in which the said portions of the rotatable support member are formed of the same fibre-reinforced material as the blades.

8. A blade assembly as claimed in claim 1 in which the blades and the rotatable support member are respectively formed of a plurality of layers of fibre-reinforced material which are bonded to each other.

9. A blade assembly as claimed in claim 1 in which means are provided which cover at least the radially outermost portions of the said gaps which are disposed between adjacent blades.

10. A blade assembly as claimed in claim 1 in which each blade is secured to at least one other blade by fibres end portions of which are bonded within the slots in the root portions of the blades.

11. A blade assembly as claimed in claim 10 in which the said fibres form part of fibre-reinforced synthetic resin tapes.

12. A blade assembly as claimed in claim 11 in which each tape has a curved shape between the respective root portions.

13. A blade assembly as claimed in claim 1 in which the tangs are formed of an assembly of layers of fibre-reinforced material, the cross-sectional width of said assembly varying radially so as to reduce the formation of stress concentrations.

14. A blade assembly as claimed in claim 1 in which the said gaps between the annular portions communicate with cooling passages in the blades, means being provided for passing cooling air through said gaps and into said cooling passages.

15. A blade assembly as claimed in claim 14 in which substantially radially extending vanes are mounted in said gaps, the said vanes, in operation, causing the compression of the cooling air passing through the gaps to be increased.

16. A blade assembly as claimed in claim 1 in which each root portion of each blade has bonded to each of its circumferentially opposite sides a substantially L-shaped fillet member, each fillet member having fibres which have radially extending portions, which are bonded to fibres in the respective root portion, and circumferentially extending portions which are bonded to fibres in the rotatable support member, the fillet members providing the blades with additional resistance to torsional and vibrational stresses.

17. A blade assembly as claimed in claim 16 in which the blade flanks are formed with fibres which extend at an angle to the length of the blade to give increased resistance to torsional stresses.

18. A blade assembly as claimed in claim 16 in which the annular or disc portions comprise a group thereof of which the end members of the group extend radially outwardly of the innner members of the group to define therewith an annular space in which the fillet members are disposed.

19. A blade assembly adapted for use in a fluid flow machine comprising: a fibre-reinforced rotatable support member having a plurality of axially spaced circumferentially continuous portions separated by gaps; a plurality of angularly spaced apart fibre-reinforced blades, each of which has a root portion defined by a plurality of tangs into which fibres of the blades extend, the tangs having slots therebetween, each said tang being mounted and secured in a said gap, fibres of the support member comprising both circumferentially extending fibres, to which are transmitted centrifugal loads from the fibres of the blades, and fibres which extend in the directions of the principal tensile stresses which arise in the rotatable support member from torque loading during rotation.

References Cited
UNITED STATES PATENTS

| | | | |
|---|---|---|---|
| 2,657,008 | 10/1953 | Atkinson. | |
| 2,868,441 | 1/1959 | Reutt | 253—77 XR |
| 3,424,434 | 1/1969 | Palfreyman et al. | 253—77 |
| 3,442,442 | 5/1969 | Seiwert | 253—77 XR |
| 2,857,094 | 10/1958 | Erwin | 230—134 |
| 2,929,755 | 3/1960 | Porter | 264—161 |
| 3,132,841 | 5/1964 | Wilder | 253—77 |
| 3,403,844 | 10/1968 | Stoffer | 230—134 |
| 3,456,917 | 7/1968 | Palfreyman et al. | 253—77 |

EVERETTE A. POWELL, JR., Primary Examiner

U.S. Cl. X.R.

416—217, 230